United States Patent
Hanada et al.

(10) Patent No.: US 12,007,507 B2
(45) Date of Patent: Jun. 11, 2024

(54) CONTROL DEVICE, IRRADIATION SYSTEM, CONTROL METHOD, AND PROGRAM

(71) Applicant: PIONEER CORPORATION, Tokyo (JP)

(72) Inventors: Kenichi Hanada, Kawagoe (JP); Shogo Miyanabe, Kawagoe (JP); Yoshichika Sato, Kofu (JP); Kouhei Nakamura, Kofu (JP)

(73) Assignee: PIONEER CORPORATION, Tokyo (JP)

( * ) Notice: Subject to any disclaimer, the term of this patent is extended or adjusted under 35 U.S.C. 154(b) by 974 days.

(21) Appl. No.: 16/969,533

(22) PCT Filed: Feb. 7, 2019

(86) PCT No.: PCT/JP2019/004374
§ 371 (c)(1),
(2) Date: Aug. 12, 2020

(87) PCT Pub. No.: WO2019/159802
PCT Pub. Date: Aug. 22, 2019

(65) Prior Publication Data
US 2021/0003674 A1    Jan. 7, 2021

(30) Foreign Application Priority Data
Feb. 13, 2018  (JP) ................. 2018-022812

(51) Int. Cl.
*G02B 26/08* (2006.01)
*G01S 7/481* (2006.01)
(Continued)

(52) U.S. Cl.
CPC ............ *G01S 7/4817* (2013.01); *G01S 17/42* (2013.01); *G02B 26/101* (2013.01); *G01S 17/931* (2020.01)

(58) Field of Classification Search
CPC ...... G01S 7/4817; G01S 17/42; G01S 17/931; G01S 7/4917; G01S 17/87; G02B 26/101
See application file for complete search history.

(56) References Cited

U.S. PATENT DOCUMENTS 8,816,937 B2  8/2014  Tsuida
9,857,472 B2  1/2018  Mheen et al.
(Continued)

FOREIGN PATENT DOCUMENTS

JP  2000241740 A  9/2000
JP  2003140069 A  5/2003
(Continued)

OTHER PUBLICATIONS

Office Action dated Apr. 19, 2022 from corresponding JP Patent Application No. 2020-500440, 3 pages.
(Continued)

*Primary Examiner* — Euncha P Cherry
(74) *Attorney, Agent, or Firm* — Procopio, Cory, Hargreaves & Savitch LLP

(57) ABSTRACT

An irradiation system (100) comprises a plurality of irradiation devices (1) and a control device (2). The plurality of irradiation devices (1) are arranged adjacent to one another in a first direction. Each of the plurality of irradiation devices (1) is able to move an electromagnetic wave in a second direction different from the first direction while moving the electromagnetic wave in the first direction. The control device (2) controls the plurality of irradiation devices. Specifically, the control device (2) separates an irradiation position of the electromagnetic wave of each of
(Continued)

the plurality of irradiation devices (1) from the control device by at least a predetermined distance or more in the second direction at a predetermined timing.

12 Claims, 6 Drawing Sheets

(51) Int. Cl.
　　　*G01S 17/42*　　　(2006.01)
　　　*G02B 26/10*　　　(2006.01)
　　　*G01S 17/931*　　(2020.01)

(56) References Cited

U.S. PATENT DOCUMENTS

| | | |
|---|---|---|
| 9,869,754 B1 | 1/2018 | Campbell et al. |
| 10,267,898 B2 | 4/2019 | Campbell et al. |
| 10,436,904 B2 | 10/2019 | Moss et al. |
| 2012/0007845 A1 | 1/2012 | Tsuida |
| 2012/0140202 A1 | 6/2012 | Rothenberger |
| 2015/0009485 A1 | 1/2015 | Mheen et al. |
| 2015/0377696 A1* | 12/2015 | Shpunt .................. G01S 7/4817 359/796 |
| 2016/0306043 A1 | 10/2016 | Moss et al. |
| 2018/0275249 A1 | 9/2018 | Campbell et al. |
| 2019/0250254 A1 | 8/2019 | Campbell et al. |

FOREIGN PATENT DOCUMENTS

| | | |
|---|---|---|
| JP | 2007025190 A | 2/2007 |
| JP | 2008040098 A | 2/2008 |
| JP | 2017167254 A | 9/2017 |
| WO | 2010116837 A1 | 10/2010 |

OTHER PUBLICATIONS

Office Action dated Sep. 21, 2021 from corresponding JP Patent Application No. 2020-500440, 2 pages.
Extended European Search Report dated Sep. 9, 2021 from corresponding EP Patent Application No. 19755064.3, 9 pages.
International Search Report for related Int. App. No. PCT/JP2019/004374 dated May 7, 2019; 1 page.

\* cited by examiner

CONTROL DEVICE, IRRADIATION SYSTEM, CONTROL METHOD, AND PROGRAM

CROSS-REFERENCE TO RELATED APPLICATIONS

This application is a U.S., National Stage entry of PCT Application No: PCT/JP2019/004174 filed. Feb. 7, 2019, which claims priority to Japanese Patent Application No. 2018-022812, filed Feb. 13, 2018, the contents of which are incorporated herein by reference.

TECHNICAL FIELD

The present invention relates to a control device, an irradiation system, a control method, and a program.

BACKGROUND ART

In recent years, a sensor that irradiates an electromagnetic wave, such as a light, and detects a reflected wave of the electromagnetic wave is provided in a mobile object, such as a vehicle, and control of the mobile object is performed using a detection result of the sensor. In the sensor for such an application, the electromagnetic wave to be irradiated is moved using a device, such as micro electro mechanical systems (MEMS).

An example of a device for moving the electromagnetic wave is described in Patent Document 1. The device described in Patent Document 1 comprises a movable reflection mirror. The reflection mirror is vibrated by electrostatic force generated on an electrode. The electrostatic force is controlled by a voltage applied to the electrode.

RELATED DOCUMENT

Patent Document

[Patent Document 1] Japanese Unexamined Patent Publication No. 2017-167254

SUMMARY OF THE INVENTION

Technical Problem

In a case when the electromagnetic wave is moved using the movable reflection mirror, the reflection mirror moves an irradiation position of the electromagnetic wave in a second direction different from a first direction while moving the irradiation position of the electromagnetic wave in the first direction. On the other hand, in order to extend a detection range, a plurality of sensors are used in parallel. In this case, although the detection ranges of a plurality of sensors are arranged, in order to prevent the occurrence of a gap between adjacent detection ranges, it is necessary to overlap ends of adjacent detection ranges each other. Thus, there is a possibility that the intensity of the electromagnetic wave becomes excessively strong in the overlapping portion. In addition, in the overlapping portion, since a sensor cannot distinguish whether a reception signal accompanied with a reflected wave from an object is a reception signal of the electromagnetic wave irradiated from the sensor or a reception signal of the electromagnetic wave irradiated from an adjacent sensor in the overlapping portion, there is a possibility that the sensor detects an erroneous signal.

An example of a problem to be solved by the invention is to prevent the occurrence of a region where there is a possibility that the intensity of the electromagnetic wave becomes excessively strong and an erroneous signal is detected in a case where the detection range is extended using a plurality of sensors.

Solution to Problem

According to the invention of claim 1, there is provided a control device that controls a plurality of irradiation devices arranged adjacent to one another in a first direction,
in which each of the plurality of irradiation devices is able to move an irradiation position of an electromagnetic wave in a second direction different from the first direction while moving the irradiation position of the electromagnetic wave in the first direction, and
controls such that the irradiation position of the electromagnetic wave of each of the plurality of irradiation devices is separated by a predetermined distance or more in the second direction at a predetermined timing.

According to the invention of claim 8, there is provided an irradiation system including a plurality of irradiation devices, and
a control device that controls the plurality of irradiation devices,
in which each of the plurality of irradiation devices is able to move an irradiation position of an electromagnetic wave in a second direction different from the first direction while moving the irradiation position of the electromagnetic wave in the first direction, and
the control device controls such that the irradiation position of the electromagnetic wave of each of the plurality of irradiation devices is separated by a predetermined distance or more in the second direction at a predetermined timing.

According to the invention of claim 9, there is provided a control method for use in a control device that controls a plurality of irradiation devices arranged adjacent to one another in a first direction,
each of the plurality of irradiation devices being able to move an irradiation position of an electromagnetic wave in a second direction different from the first direction while moving the irradiation position of the electromagnetic wave in the first direction,
the control method comprising a step of performing control such that the irradiation position of the electromagnetic wave of each of the plurality of irradiation devices is separated by a predetermined distance or more in the second direction at a predetermined timing.

According to the invention of claim 10, there is provided a program that causes a computer to function as a control device for controlling an irradiation device,
the irradiation device being able to move an irradiation position of an electromagnetic wave in a second direction different from a first direction while moving the irradiation position of an electromagnetic wave in the first direction,
the program providing the computer with
a function of storing information indicating how much the irradiation position of the electromagnetic wave is shifted from a reference in the second direction, and
a function of receiving the reference in the second direction and controlling an irradiation direction of the electromagnetic wave using the received reference and the stored information.

BRIEF DESCRIPTION OF THE DRAWINGS

The above and other objects, features, and advantages will become apparent from preferred embodiments described below and the accompanying drawings.

DESCRIPTION OF EMBODIMENTS

Figure 1:
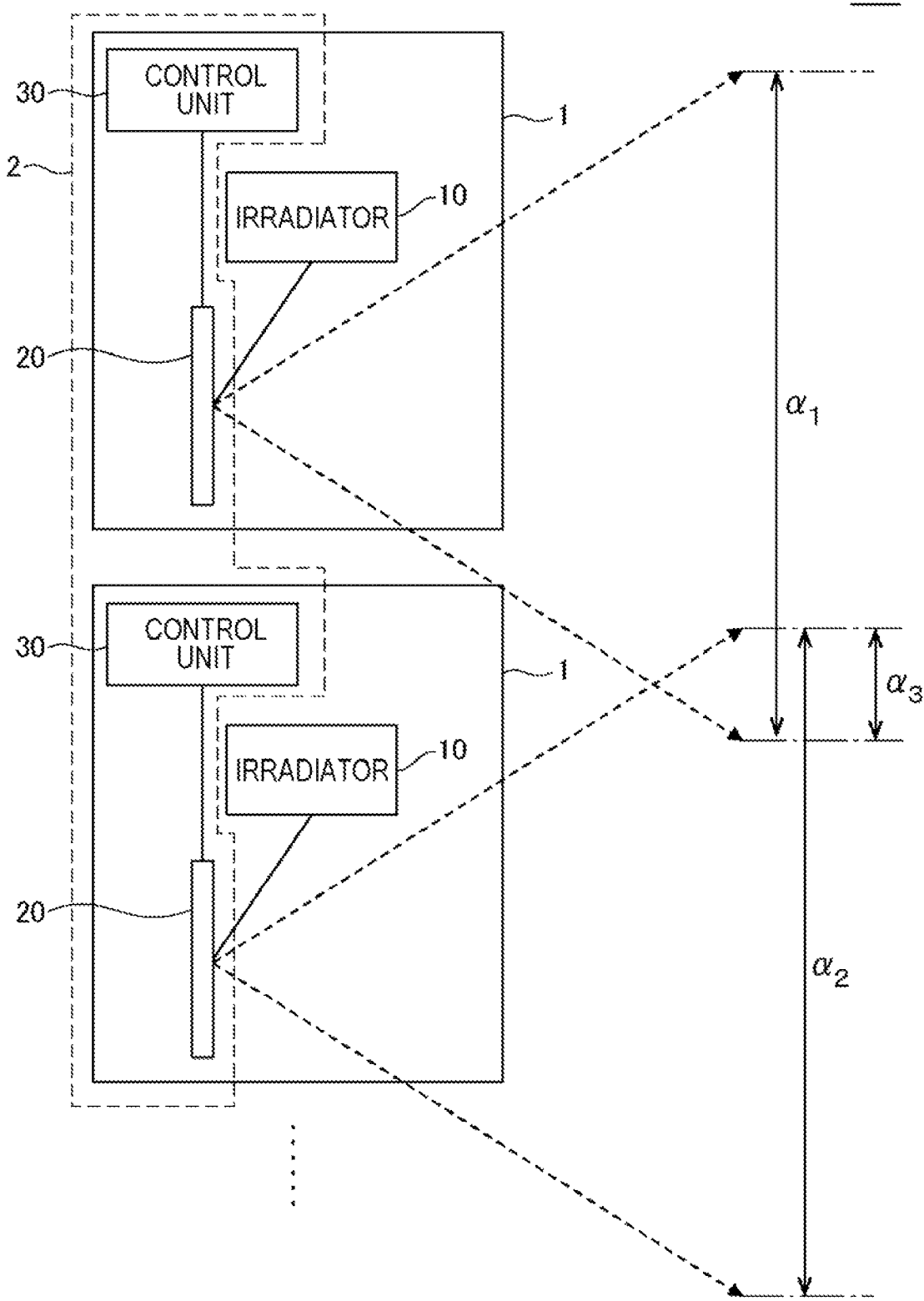
FIG. 1 is a diagram showing the configuration of an irradiation system according to an embodiment.

Hereinafter, an embodiment of the invention will be described referring to the drawings. In all drawings, like components are represented by like reference numerals, and description thereof will not be repeated.

Embodiment

FIG. 1 is a diagram showing the configuration of an irradiation system 100 according to an embodiment. The irradiation system 100 according to the embodiment comprises a plurality of irradiation devices 1 and a control device 2. A plurality of irradiation devices 1 are arranged adjacent to one another in a first direction. Each of a plurality of irradiation devices 1 can also move an irradiation position of an electromagnetic wave in a second direction different from the first direction while moving the irradiation position of the electromagnetic wave in the first direction. The control device 2 controls a plurality of irradiation devices. In detail, the control device 2 performs control such that the irradiation position of the electromagnetic wave of each of a plurality of irradiation devices 1 is separated from the control device by at least a predetermined distance or more in the second direction at a predetermined timing. In the embodiment, a control unit 30 that is a part of the irradiation device 1 is also a part of the control device 2. Hereinafter, the irradiation system 100 will be described in detail.

The irradiation system 100 is mounted in, for example, a mobile object, such as a vehicle. As described above, the irradiation system 100 comprises a plurality of irradiation devices 1. Each irradiation device 1 comprises an irradiator 10, a movable reflection unit 20, and a control unit 30. Then, as described above, the control device 2 comprises the movable reflection unit 20 and the control unit 30 provided in each of a plurality of irradiation devices 1. Each irradiation device 1 is, for example, Light Detection and Ranging (LIDAR) or a millimeter wave radar, and detects a relative position of an object positioned around the mobile object when the mobile object is set as a reference. In this case, the irradiation device 1 also comprises a light receiver.

The irradiator 10 irradiates an electromagnetic wave, such as light. In a case where the irradiator 10 irradiates light, the irradiator 10 is, for example, a semiconductor laser, such as a laser diode, and emits laser with an input of electric energy. The control unit 30 controls an emission timing and emission intensity of the irradiator 10 by controlling power input to the irradiator 10. Hereinafter, description will be provided assuming that the electromagnetic wave irradiated from the irradiator 10 is light.

The movable reflection unit 20 comprises at least one movable mirror and can change an irradiation direction of light emitted from the irradiator 10 in a two-dimensional manner. In a case where the movable reflection unit 20 has one movable mirror, an inclination of the movable mirror can be changed around each of two axes perpendicular to each other. In a case where the movable reflection unit 20 has two movable mirrors, the axes of the two movable mirrors are perpendicular to each other.

The inclination of the movable mirror provided in the movable reflection unit 20 can be controlled, for example, by a voltage input to the movable reflection unit 20. The voltage is controlled by the control unit 30. Specifically, the voltage input to the movable reflection unit 20 changes cyclically. The voltage is, for example, a sinusoidal wave. In this case, a reflection direction of light of the movable reflection unit 20 is changed cyclically, for example, in a sinusoidal manner.

The control unit 30 is realized using, for example, an integrated circuit. The integrated circuit has, for example, a bus, a processor, a memory, a storage device, an input-output interface, and a network interface. The bus is a data transmission path through which the processor, the memory, the storage device, the input-output interface, and the network interface transmit and receive data to and from one another. Note that a method for connecting the processor and the like to one another is not limited to bus connection. The processor is an arithmetic processing device that is realized using a microprocessor or the like. The memory is a memory that is realized using a Random Access Memory (RAM) or the like. The storage device is a storage device that is realized using a Read Only Memory (ROM), a flash memory, or the like.

The input-output interface is an interface that connects the integrated circuit to peripheral devices. The peripheral devices are, for example, the irradiator 10 and the movable reflection unit 20.

The network interface is an interface that connects the integrated circuit to a communication network. The communication network is, for example, a Controller Area Network (CAN) communication network. A connection method of the network interface to the communication network may be wireless connection or may be wired connection.

The storage device stores a program module that realizes the function of the control unit 30. The processor realizes the function of the control unit 30 by reading the program module into the memory and executing the program module. The program module may be stored in the memory. In this case, the integrated circuit may not comprise the storage device.

Figure 2:
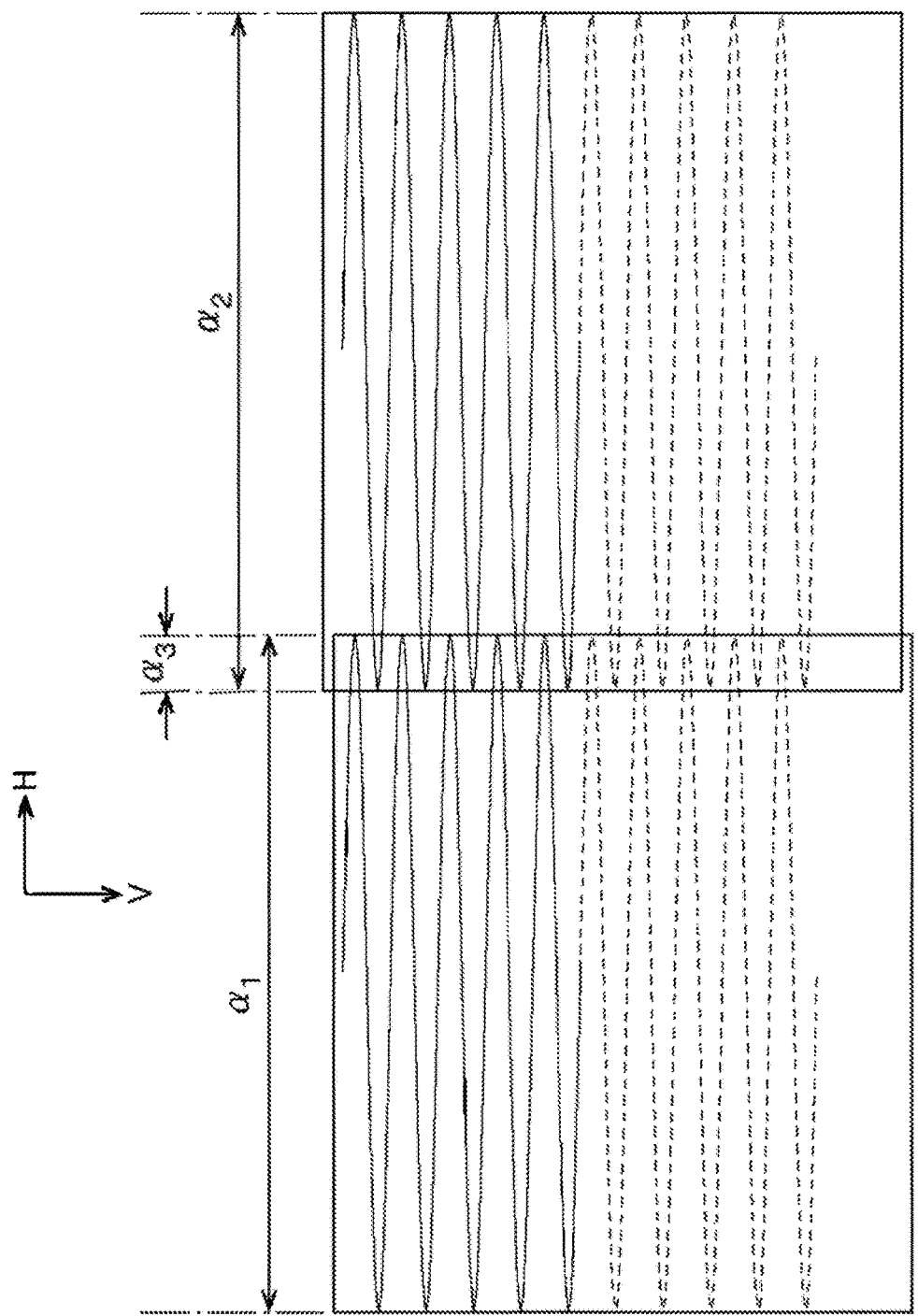
FIG. 2 is a diagram illustrating an irradiation range of light of the irradiation system.

FIG. 2 is a diagram illustrating an irradiation range of light of the irradiation system 100. Light from the irradiator 10 is moved by controlling the movable reflection unit 20. Specifically, as shown in FIG. 2, the control unit 30 moves light in the first direction (H direction) cyclically and simultaneously moves light in the second direction (V direction) perpendicular to the first direction cyclically. The first direction corresponds to a first rotation axis of the movable reflection unit 20, and the second direction corresponds to a second rotation axis of the movable reflection unit 20. Then, a movement cycle in the first direction is shorter than a movement cycle in the second direction. For example, the control unit 30 uses a sinusoidal wave for a control signal for controlling the movement in the first direction (H direction) among signals input to the movable reflection unit 20 and uses a signal (for example, a sawtooth wave) having a cycle longer than the sinusoidal wave for a control signal for controlling the movement in the second direction (V direction) among the signals input to the movable reflection unit 20. For this reason, as shown in FIG. 2, light gradually moves in the V direction (horizontal direction) while moving in the H direction (horizontal direction) cyclically in FIG. 2. As a result, the control unit 30 irradiates light in a substantially rectangular range.

As shown in FIG. 1, the irradiation system 100 comprises a plurality of irradiation devices 1. Then, a range α where light is irradiated is determined for each of a plurality of irradiation devices 1. A plurality of ranges α are arranged in parallel to one another in at least the first direction (H direction). In the example shown in the drawing, in a case where an irradiation range of light of a first irradiation device 1 is a first range α1, and an irradiation range of light of a second irradiation device 1 is a second range α2, the first range α1 and the second range α2 are arranged in the first direction (H direction). Then, in order to prevent the occurrence of a gap between the ranges where light is irradiated in a case where the irradiation system 100 is regarded as a single device, it is necessary to partially overlap adjacent ranges α. For example, as shown in FIGS. 1 and 2, a part of the first range α1 overlaps a part of the second range α2. In the overlapping range (hereinafter, referred to as an overlap range α3), when an irradiation timing of light of the first irradiation device 1 overlaps an irradiation timing of light of the second irradiation device 1, there is a concern that the irradiation intensity of light to the overlap range α3 becomes higher than expected.

Figure 3:
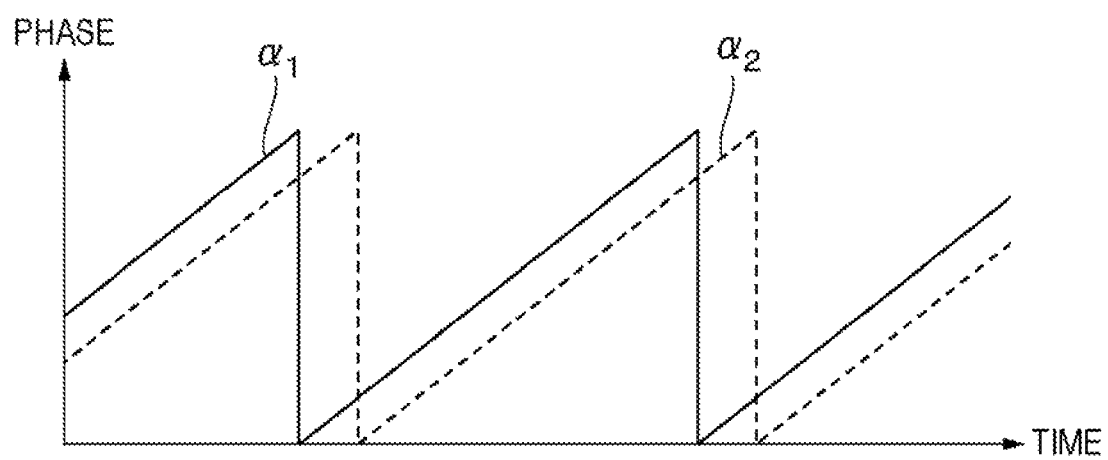
FIG. 3 is a diagram illustrating an example of control of a control device.

In contrast, in the embodiment, the control device 2 makes the irradiation timing of light to the overlap range α3 different between the first irradiation device 1 and the second irradiation device 1. For example, the control device 2 separates the irradiation position of the electromagnetic wave of each of a plurality of irradiation devices by at least the predetermined distance or more in the second direction at a predetermined timing. In the embodiment, the control device 2 performs this control at any timing (that is, constantly). Specifically, as shown in FIG. 3, two control units 30 make a phase in the V direction (second direction) of the movable reflection unit 20 (corresponding to the first range α1) of the first irradiation device 1 and a phase in the V direction (second direction) of the movable reflection unit 20 of the second irradiation device 1 (corresponding to the second range α2) different from each other.

The above-described predetermined distance may be substituted with a predetermined angle. A minimum value of the predetermined angle is determined, for example, such that an instantaneous field of view of adjacent sensors does not enter a spread angle of any irradiated electromagnetic wave. That is, the spread angle of the irradiated electromagnetic wave becomes a minimum predetermined angle to be separated. The minimum predetermined angle is present in each of the H direction and the V direction.

Figure 4A:
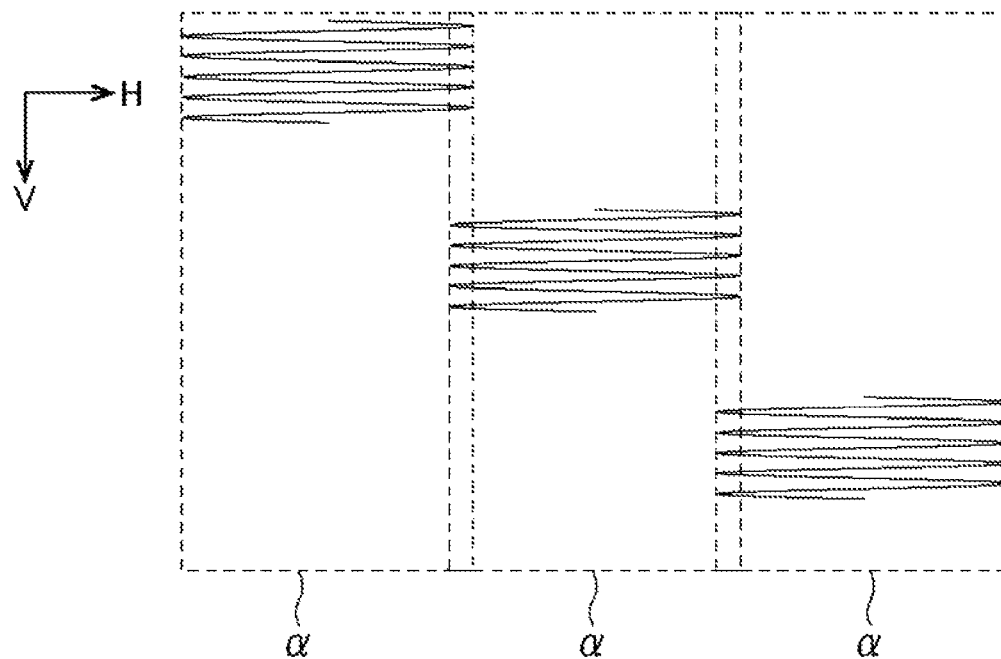
FIGS. 4A and 4B are diagrams illustrating an example of control of the control device.
Figure 4B:
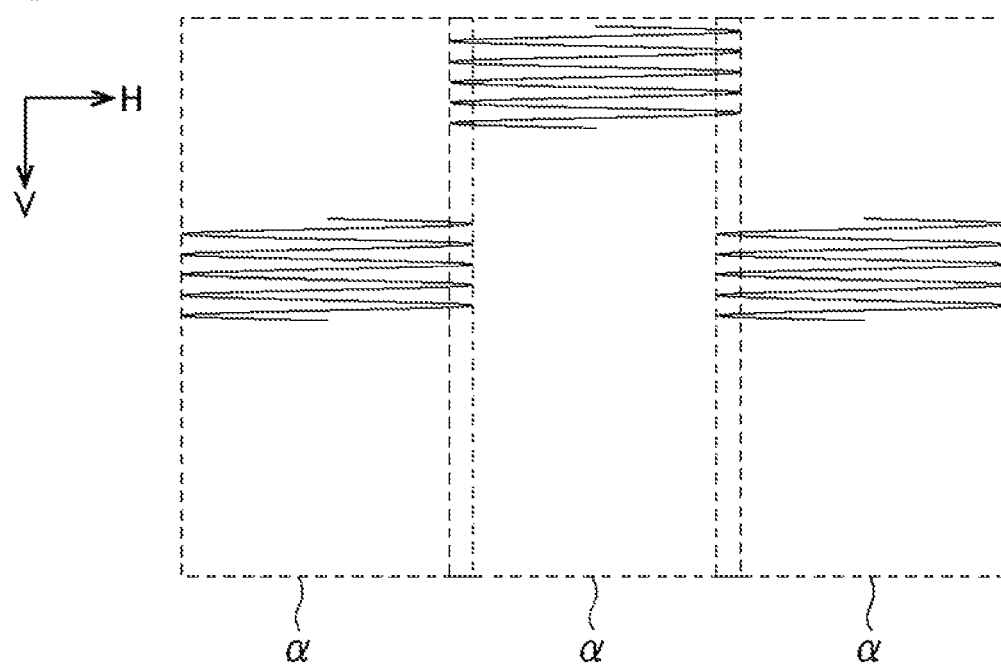

In FIG. 1, two irradiation devices 1 are shown. On the other hand, in a case where the irradiation system 100 has three or more irradiation devices 1 and the ranges α of the irradiation devices 1 are arranged in the first direction (H direction), as the range α goes in the first direction (H direction), the phase of the movable reflection unit 20 in the V direction (second direction) may be gradually shifted in the same direction (for example, a direction in which the phase progresses) as shown in FIG. 4A or may be shifted such that a way of phase progress becomes zigzagged as shown in FIG. 4B. In a case of FIG. 4B, for example, two kinds of phases may be made to alternately appear.

In order to make the irradiation timing of light to the overlap range α3 different between the first irradiation device 1 and the second irradiation device 1, it is necessary to operate a plurality of control units 30 in an interworking manner. Hereinafter, an example of a method of operating in an interworking manner will be described.

Figure 5:
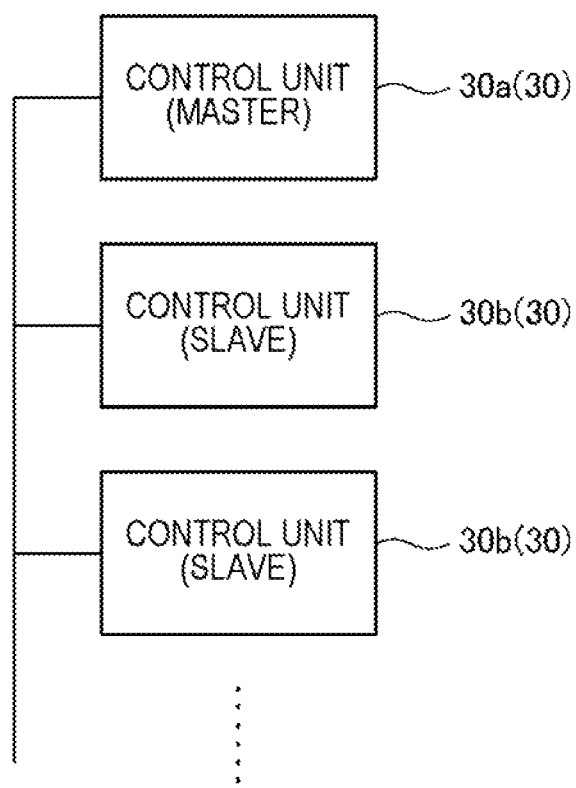
FIG. 5 is a diagram illustrating a first method for operating a plurality of control units in an interworking manner.

FIG. 5 is a diagram illustrating a first method for operating a plurality of control units 30 in an interworking manner. In an example shown in the drawing, a plurality of control units 30 are connected to one another by signal lines or in a wireless manner. Then, any one control unit 30 becomes a master (hereinafter, referred to as a master control unit 30a) and the remaining control units 30 become slaves (hereinafter, referred to as slave control units 30b). Each of a plurality of slave control units 30b stores in advance information for specifying how much the phase in the V direction of the movable reflection unit 20 controlled by the slave control unit 30b is to be delayed (or advanced) (that is, information indicating how much the phase is shifted from the reference) with respect to the movable reflection unit 20 controlled by the master control unit 30a. Then, the master control unit 30a outputs information (that is, the reference) for specifying the phase of the movable reflection unit 20 controlled by the master control unit 30a to a plurality of slave control units 30b. Each of the slave control units 30b specifies the phase in the V direction of the movable reflection unit 20 using information received from the master control unit 30a and information stored in advance.

It is preferable that a delay amount (or an advance amount) stored in advance in each of the slave control units 30b is an integer multiple of a cycle in the H direction.

Figure 6:
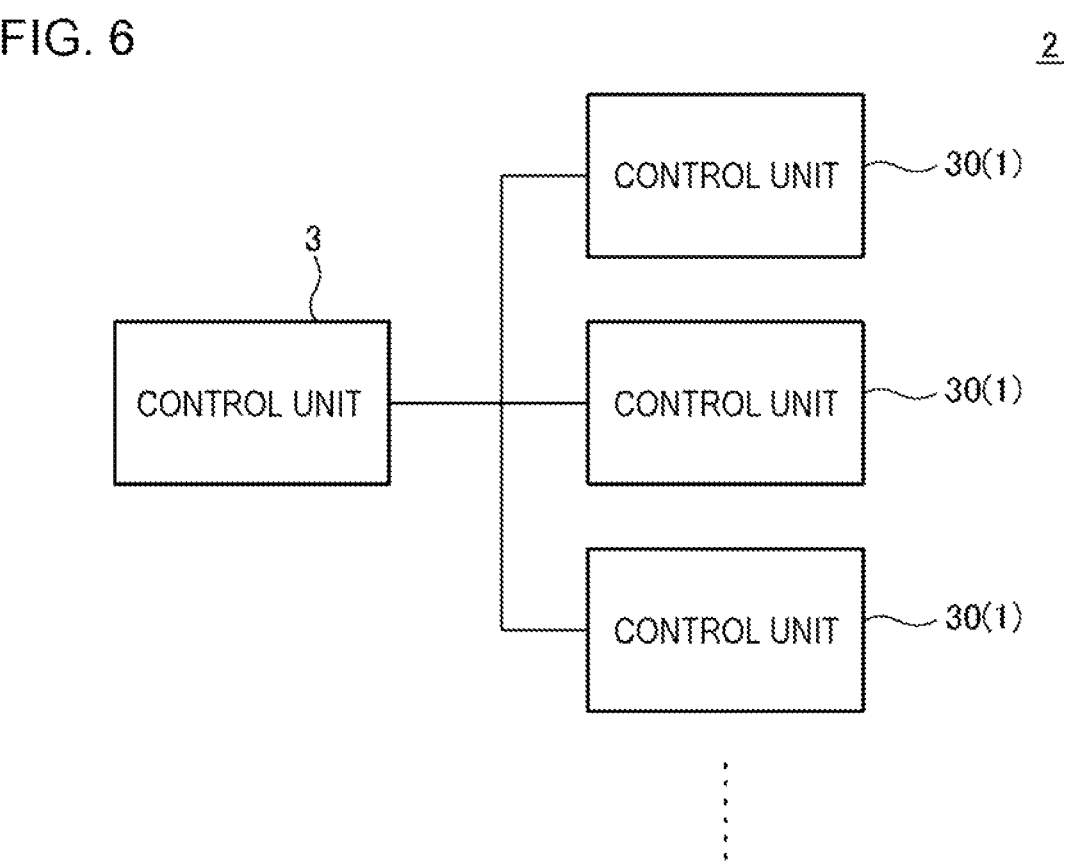
FIG. 6 is a diagram illustrating a second method for operating a plurality of control units in an interworking manner.

FIG. 6 is a diagram illustrating a first method for operating a plurality of control units 30 in an interworking manner. In an example shown in the drawing, an irradiation system 100 comprises a control device 3 as a part of a control device 2. The control device 3 is a device different from any irradiation device 1. The control device 3 and a plurality of control units 30 are connected to one another by signal lines or in a wireless manner. The control device 3 is a master, and outputs a reference timing to a plurality of control units 30. Each of a plurality of control units 30 becomes a slave, and store in advance information for specifying how much the phase in the V direction of the movable reflection unit 20 controlled by the control unit 30 is to be delayed (or advanced) with respect to the reference timing. Each of a plurality of control units 30 specifies the phase in the V direction of the movable reflection unit 20 using the reference timing received from the control device 3 and information stored in advance.

According to the embodiment described above, the control device 2 separates the irradiation position of the electromagnetic wave of each of a plurality of irradiation devices 1 by at least the predetermined distance or more in the second direction. For this reason, even though the overlap range α3 shown in FIG. 1 occurs, there is little possibility that a plurality of irradiation devices 1 simultaneously irradiate the overlap range α3 with the electromagnetic waves. Accordingly, a region where there is a possibility that the intensity of the electromagnetic wave becomes excessively strong and an erroneous signal is detected hardly occurs.

Although the embodiments and examples have been described above referring to the drawings, the embodiments and the examples are merely illustrative, and various configurations other than those described above can be employed.

This application claims priority based on Japanese Patent Application No. 2018-022812, filed on Feb. 13, 2018, the entire disclosure of which is incorporated herein by reference.

The invention claimed is:

1. A control device that controls a plurality of irradiation devices arranged adjacent to one another in a first direction,
    wherein each of the plurality of irradiation devices comprises a reflector which is able to move an irradiation position of an electromagnetic wave in a second direction different from the first direction while moving the irradiation position of the electromagnetic wave in the first direction, and
    wherein the control device controls such that the irradiation position of the electromagnetic wave of each of the plurality of irradiation devices is separated from the electromagnetic wave of another of the plurality of irradiation devices by a predetermined distance or more in the second direction at a predetermined timing.

2. The control device according to claim 1, wherein control is performed such that the irradiation position or the electromagnetic wave of each of the plurality of irradiation devices is separated by the predetermined distance or more in at least the second direction at any timing.

3. The control device according to claim 1, wherein each of the plurality of irradiation devices comprises:
    an irradiator that irradiates the electromagnetic wave;
    a movable reflection unit comprising the reflector that reflects the electromagnetic wave;
    a control unit that controls the movable reflection unit; and
    at least a part of the control device is the control unit of each of the plurality of irradiation devices.

4. The control device according to claim 3, wherein the control unit repeatedly moves the irradiation position of the electromagnetic wave in the first direction and simultaneously repeatedly moves the irradiation position of the electromagnetic wave in the second direction by controlling the movable reflection unit, and
    wherein the control device makes a phase in the second direction of the movable reflection unit of a first irradiation device of the plurality of irradiation devices and a phase in the second direction of the movable reflection unit of a second irradiation device of the plurality of irradiation devices positioned adjacent to the first irradiation device different from each other.

5. The control device according to claim 4, wherein a movement cycle in the first direction of the electromagnetic wave is shorter than a cycle in the second direction of the electromagnetic wave.

6. The control device according to claim 4, wherein the control unit of the first irradiation device outputs phase information indicating the phase in the second direction of the first irradiation device to the control unit of another irradiation device, and
    wherein the control unit of the other irradiation device controls the phase in the second direction of the movable reflection unit of the other irradiation device using the phase information.

7. The control device according to claim 4, wherein the control device receives phase information to be a reference of the phase in the second direction, and
    wherein the control unit of each of the plurality of irradiation devices controls the phase in the second direction of the movable reflection unit corresponding to the control unit using the phase information.

8. An irradiation system comprising:
    a plurality of irradiation devices arranged adjacent to one another in a first direction; and
    a control device that controls the plurality of irradiation devices,
    wherein each of the plurality of irradiation devices comprises a reflector which is able to move an irradiation position of an electromagnetic wave in a second direction different from the first direction while moving the irradiation position of the electromagnetic wave in the first direction, and
    wherein the control device controls such that the irradiation position of the electromagnetic wave of each of the plurality of irradiation devices is separated from the electromagnetic wave of another of the plurality of irradiation devices by a predetermined distance or more in the second direction at a predetermined timing.

9. A control method for use in a control device that controls a plurality of irradiation devices arranged adjacent to one another in a first direction,
    each of the plurality of irradiation devices comprising a reflector which is able to move an irradiation position of an electromagnetic wave in a second direction different from the first direction while moving the irradiation position of the electromagnetic wave in the first direction,
    the control method comprising:
        performing control such that the irradiation position of the electromagnetic wave of each of the plurality of irradiation devices is separated from the electromagnetic wave of other of the plurality of irradiation devices by a predetermined distance or more in the second direction at a predetermined timing.

10. A program that causes a computer to function as a control device for controlling an irradiation device,
    the irradiation device comprising a reflector which is able to move an irradiation position of an electromagnetic wave in a second direction different from a first direction while moving the irradiation position of the electromagnetic wave in the first direction,
    the program providing the computer with:
        a function of storing information indicating how much the irradiation position of the electromagnetic wave is shifted from a reference in the second direction; and
        a function of receiving the reference in the second direction and controlling an irradiation direction of the electromagnetic wave using the received reference and the stored information.

11. The control device according to claim 1, wherein each of the plurality of irradiation devices comprises:
    a controller that controls the reflector, and
    wherein the controller repeatedly moves the irradiation position of the electromagnetic wave in the first direction and simultaneously repeatedly moves the irradiation position of the electromagnetic wave in the second direction by controlling the reflector.

12. The control device according to claim 11, wherein the control device makes a phase in the second direction of the reflector of a first irradiation device of the plurality of irradiation devices, and a phase in the second direction of the reflector of a second irradiation device of the plurality of irradiation devices positioned adjacent to the first irradiation device different from each other.

\* \* \* \* \*